(12) United States Patent
Roskey

(10) Patent No.: US 6,239,506 B1
(45) Date of Patent: May 29, 2001

(54) WIND ENERGY COLLECTION SYSTEM

(76) Inventor: John Roskey, 7456 Old Highway 395., Carson City, NV (US) 89704

( * ) Notice: Subject to any disclaimer, the term of this patent is extended or adjusted under 35 U.S.C. 154(b) by 0 days.

(21) Appl. No.: 09/290,526

(22) Filed: Apr. 12, 1999

(51) Int. Cl.$^7$ .................................................. H02P 9/04
(52) U.S. Cl. .............................. 290/55; 290/44; 290/53; 290/54
(58) Field of Search .................................. 290/44, 53, 54, 290/55

(56) References Cited

U.S. PATENT DOCUMENTS

| | | | |
|---|---|---|---|
| 3,883,750 | * 5/1975 | Uzzell, Jr. ............................ | 290/55 |
| 4,002,023 | 1/1977 | Hartmann ............................ | 290/55 |
| 4,162,410 | * 7/1979 | Amick ................................. | 290/55 |
| 4,504,192 | 3/1985 | Cyrus et al. ........................ | 290/55 |
| 4,508,973 | * 4/1985 | Payne ................................. | 290/55 |
| 4,546,264 | 10/1985 | Pinson ................................. | 290/55 |
| 4,781,523 | * 11/1988 | Aylor ................................. | 415/2 A |
| 5,380,149 | * 1/1995 | Valsamidis ......................... | 415/2.1 |
| 5,391,926 | * 2/1995 | Staley et al. ........................ | 290/55 |
| 5,457,346 | * 10/1995 | Blumberg et al. .................. | 290/55 |
| 5,709,419 | 1/1998 | Roskey ............................... | 290/55 |

FOREIGN PATENT DOCUMENTS

| | | | |
|---|---|---|---|
| 4 002 341 | 8/1990 | (DE) | ............................ 290/55 |
| 450 138 | 3/1913 | (FR) | ............................ 290/55 |
| 1 195 450 | 11/1959 | (FR) | ............................ 290/55 |
| 2 379 709 | 10/1978 | (FR) | ............................ 290/55 |

* cited by examiner

*Primary Examiner*—Elvin Enad
(74) *Attorney, Agent, or Firm*—Burns, Doane, Swecker and Mathis, LLP

(57) ABSTRACT

A device for collecting energy from wind includes an airfoil formed from a tubular member with a circular cross-section and a substantially planar leading edge. As an airflow passes over the airfoil, from the substantially planar leading edge to a trailing edge, a Bernoulli effect reduced pressure region results adjacent one or more slots. The slots are positioned directly behind the leading edge and extend to a section of greatest diameter of the airfoil. This Bernoulli effect reduced pressure region in combination with counter-rotating eddies formed by the front leading edge cause air to be drawn out of the tubular member. An airflow driven turbine capable of converting an airflow into rotational mechanical energy is connected to an interior of the tubular member though air passageways. A flow of air is drawn though the airflow turbine and through the air passageways by the Bernoulli effect and the counter-rotating eddies created by the airfoil. The flow of air through the turbine is converted into rotational mechanical energy.

21 Claims, 4 Drawing Sheets

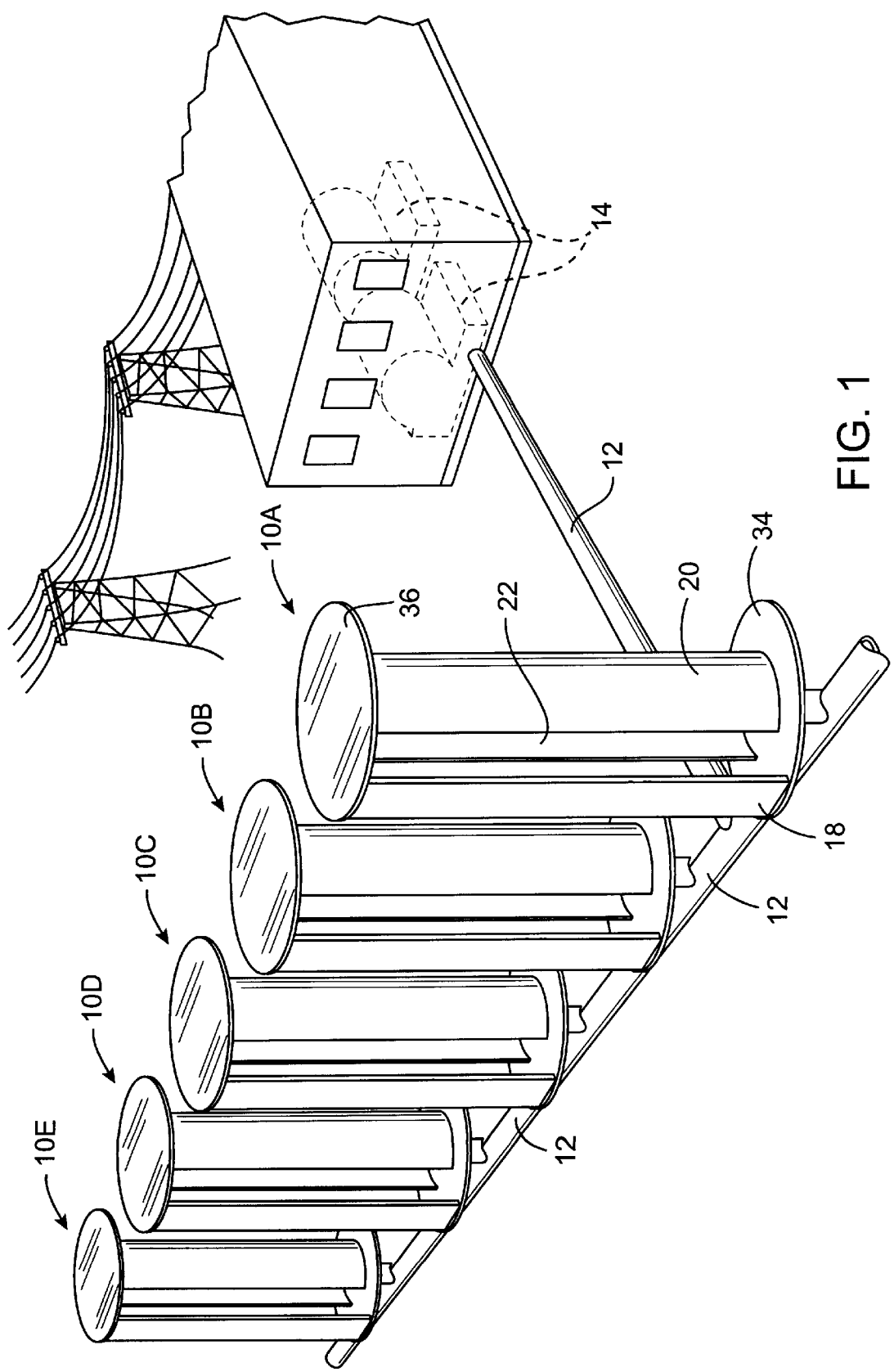

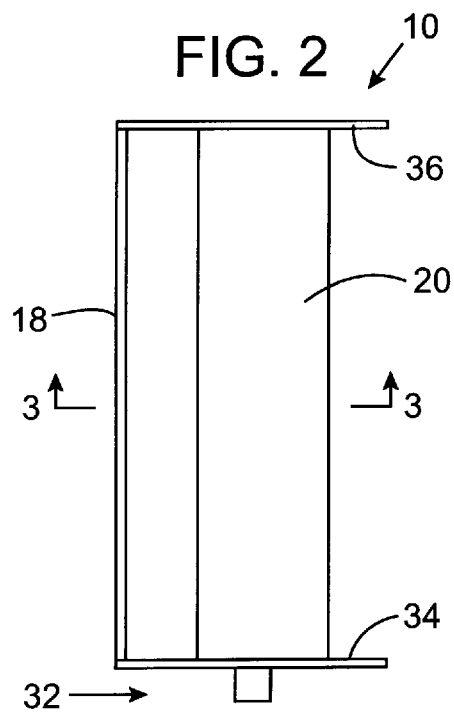
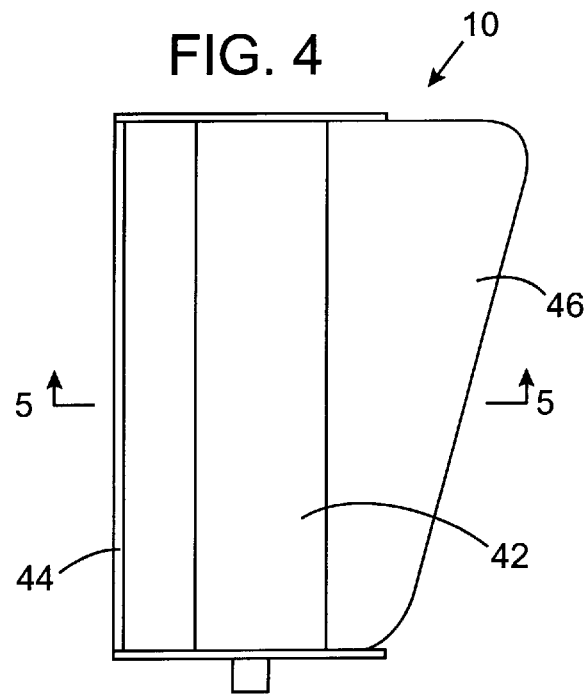
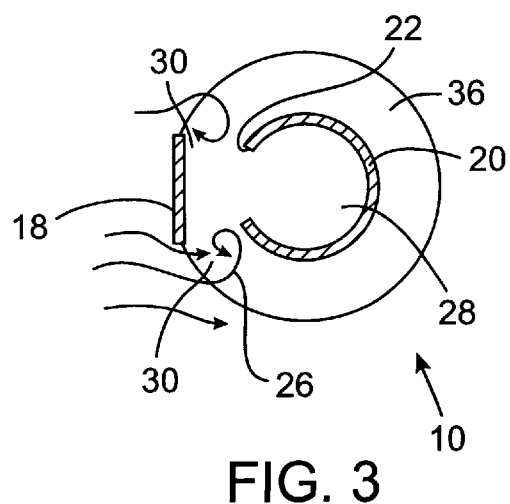
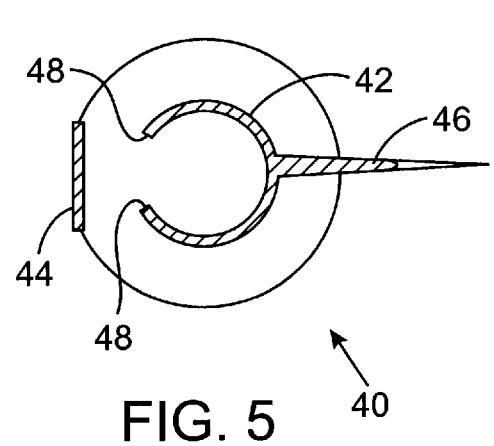

WIND ENERGY COLLECTION SYSTEM

BACKGROUND OF THE INVENTION

1. Field of the Invention

The invention relates to a wind energy collection system, and more particularly, the invention relates to systems and methods for collecting energy from wind and converting the wind energy to useful energy forms.

2. Brief Description of the Related Art

Many wind energy collection systems have been proposed in the prior art. Classic windmills and wind turbines employ vanes or propeller surfaces to engage a wind stream and convert the energy in the wind stream into rotation of a horizontal windmill shaft. These classic windmills with exposed rotating blades pose many technical, safety, environmental, noise, and aesthetic problems. The technical problems include mechanical stress, wind gusts and shadow shock, differential blade pitch control, active steering, and dynamic instability which may lead to material fatigue and catastrophic failure. In addition, the propeller blades can cause safety concerns and significant noise generation. Furthermore, these horizontal axis wind turbines cannot take advantage of high energy, high velocity winds because these winds can overload the turbines or the moving blade systems causing damage or failure. In fact, it is typical to shut down conventional horizontal windmills at wind speeds in excess of 35 mph to avoid these problems. Since wind energy increases as the cube of velocity, this represents a serious disadvantage in that high wind velocities which offer high available energies require that the windmills be shut down.

Vertical axis turbines are a more recent development. Although vertical axis turbines address many of the shortcomings of horizontal shaft windmills, they have their own inherent problems. Many vertical axis turbines are very large, employing towers hundreds of feet in the air. They are also expensive and have a significant aesthetic impact.

One alternative to the horizontal and vertical axis wind turbines described above is the airfoil wind energy collection system described in U.S. Pat. No. 5,709,419. This system provides the advantage that the parts of the system which contact the wind to collect energy do not employ moving parts. This wind energy collection system includes an airfoil or an array of airfoils with at least one venturi slot penetrating the surface of the airfoil at about the greatest cross-sectional width of the airfoil. As air moves over the airfoil from the leading edge to the trailing edge, a region of low pressure or reduced pressure is created adjacent the venturi slot. This low pressure region, caused by the Bernoulli principal, draws air from a supply duct within the airfoil out of the venturi slot and into the airflow around the airfoil. The air supply ducts within the airfoil are connected to a turbine causing the system to draw air through the turbine and out of the airfoil slots generating power.

It would be desirable to provide a wind energy collection system with non-moving wind contacting parts which provides improved efficiency and a stronger, simpler construction.

SUMMARY OF THE INVENTION

The present invention relates to a wind energy collection system constructed from one or more airfoils with non-moving wind contacting parts and a flat leading edge for improved efficiency.

In accordance with one aspect of the present invention, the device for collecting energy from wind includes an airfoil formed from a tubular member with a circular cross-section having an opening extending longitudinally along the tubular member and a substantially planar leading edge spaced from and positioned in front of the opening, the leading edge having a width which is equal to or less than a diameter of the tubular member, and an air passageway extending through at least one slot between the tubular member and the leading edge, through the opening and through an interior of the tubular member to an air duct which allows air to be delivered from a turbine system to the airfoil. A support structure for rotatably supporting the airfoil orients the airfoil so that the planar leading edge is facing into the wind.

In accordance with an additional aspect of the present invention, a method for collecting energy from wind includes providing an airfoil which comprises a tubular member having an opening extending longitudinally along the tubular member and a substantially planar leading edge spaced from and positioned in front of the opening. The airfoil is positioned in the wind with the leading edge facing into the wind. Wind is allowed to pass around the airfoil creating eddies in and around slots between the tubular member and the leading edge and creating a low pressure region in and around the slots. An airflow-driven turbine capable of converting an airflow into mechanical energy is provided and an air passageway is provided from an interior of the tubular member to the turbine. Air is permitted to be drawn through turbine and out of the slots between the tubular member and the leading edge.

The present invention provides the advantages of improved efficiency and improved structural strength in a wind energy collection system with non-moving air contacting parts.

BRIEF DESCRIPTION OF THE DRAWINGS

The invention will now be described in greater detail with reference to the preferred embodiments illustrated in the accompanying drawings, in which like elements bear like reference numerals, and wherein:

FIG. 1 is a perspective view of a wind energy collection system according to the present invention including a plurality of airfoils;

FIG. 2 is a side view of one of the airfoils of FIG. 1;

FIG. 3 is a cross sectional view of the airfoil of FIG. 2, taken along line 3—3;

FIG. 4 is a side view of an alternative embodiment of an airfoil according to the invention;

FIG. 5 is a cross sectional view of the airfoil of FIG. 4, taken along line 5—5;

DETAILED DESCRIPTION OF THE PREFERRED EMBODIMENTS

Figure 6:
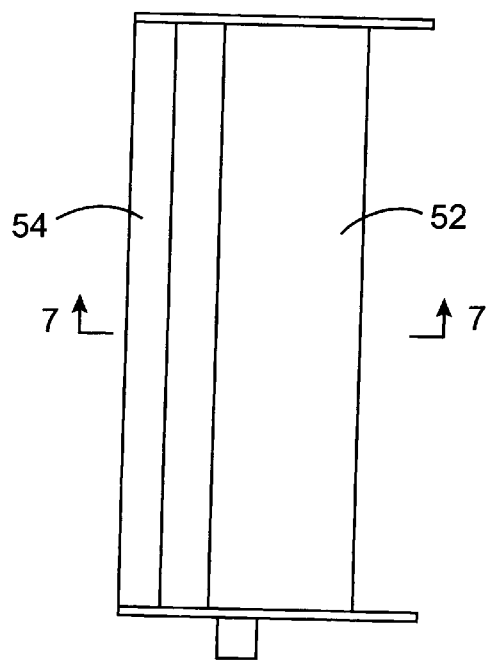
FIG. 6 is a side view of another embodiment of an airfoil according to the invention.

A device for collecting energy from wind includes one or more airfoils 10 connected by air passageways 12 to a turbine 14. As wind passes over the airfoil 10, a Bernoulli effect reduced pressure region is created which draws air out from an interior of the airfoil. The air is drawn through the air passageways 12 and through the turbine 14 causing rotation of the turbine which is converted into rotational mechanical energy.

FIG. 1 illustrates an array of airfoils 10A–10E, the interiors of which are connected by the air passageways 12 to the one or more turbines 14. The improved configuration of the airfoils 10 over those known in the prior art provide a substantial increase in efficiency of the system over the prior art. The improved efficiencies are more than two times those of the system shown in U.S. Pat. No. 5,709,419, which is incorporated herein by reference in its entirety. These improved efficiencies are due to a combination of counter rotating eddies, increased velocities, and reduced static pressures which are generated by the new airfoil design.

FIGS. 2 and 3 illustrate a first embodiment of an airfoil 10 including a substantially planar leading edge 18 and a cylindrical member 20. The cylindrical member 20, as illustrated in the cross sectional view of FIG. 3, has an opening 22 with a width of about 30° to about 80°, preferably about 60°. Positioned directly in front of the opening 22 in the cylindrical member 20 is the substantially planar leading edge 18. The leading edge 18 is preferably a plate shaped member having a height which is equal to a height of the cylindrical member 20 and a width which is equal to or slightly greater than the width of the opening 22. The optimal width of the plate shaped member is preferably approximately 0.75 times the diameter of the cylindrical member 20. The planar leading edge 18 and the cylindrical member 20 together define two slots 30. The slots 30 are positioned on either side of the airfoil 10 at a point where the air passing from the interior 28 of the cylindrical member meets the adjacent airstream. The slots 30 begin at an edge of the leading edge 18 and terminate at a widest point of the cylindrical member 20.

The airfoil 10 is oriented so that the planar leading edge 18 is facing directly into the wind as shown in FIG. 3. As the wind contacts the planar leading edge 18, eddies 26 are created in and about the regions of the slots 30 between the leading edge 18 and the cylindrical member 20. Preferably, the distance between the leading edge 18 and the opening 22 is about 0.1 to about 0.7, more preferably about 0.25 to 0.5 times the diameter of the cylindrical member 20.

As the wind stream passes around the airfoil 10, the velocity of the air increases and the static pressure decreases in accordance with the Bernoulli principal. A region of low pressure is created abeam the slots 30 behind the leading edge and extending to the greatest cross sectional width of the airfoil 10. The combination of the low pressure region and the eddies 26 created by the planar leading edge 18 draws the air out from an interior 28 of the cylindrical member 20.

With a standard wing shaped airfoil design of the prior art, the velocity of the air passing around the airfoil increases to a maximum velocity of about 1.4 times the velocity of the free air. In contrast, a substantially flat leading edge 18 can increase the adjacent velocity about 7 times that achieved with a traditional symmetrical wing shape. This leads to a substantially lower pressure adjacent to the slots 30 than can be achieved with a traditional wing shape. Thus, air is drawn out from the interior 28 of the cylindrical member at a higher rate due to the greater pressure differential created by the planar leading edge and the cylindrical member.

The airfoil 10 is supported on a support structure 32 which provides communication of air flow between the interior 28 of the cylindrical member 20 and the air passageways 12. The support structure 32 preferably includes a rotation mechanism for allowing the airfoil 10 to rotate about the support. The rotatable support structure 32 may be any of those which are known to those in the art. The airfoil 10 includes a bottom skirt member 34 and a top skirt member 36 for improved efficiencies. The skirts 34, 36 support and connect the cylindrical member 20 and the planar leading edge 18. The skirts 34, 36 also function to prevent outside air below or above the airfoil 10 from disrupting the air flow over the airfoil. The skirts 34, 36 have a diameter which is greater than 1.5 times, preferably 2 or more times the diameter of the cylindrical member 20.

FIGS. 4 and 5 illustrate an alternative embodiment of an airfoil 40 having a cylindrical member 42 and a planar leading edge 44. The airfoil 40 also includes a vane 46 which extends from the cylindrical member 42 opposite the opening 48 in the cylindrical member. The vane 46 acts to position the airfoil 40 with the planar leading edge 44 directly into the wind. As shown in the side view of FIG. 4, the vane 46 may taper from a largest width at the top of the airfoil 40 to a smallest width at the bottom of the airfoil. Although the vane 46 has been illustrated as extending along the entire length of the airfoil, a vane which extends along only a portion of the airfoil may also be used. The vane 46 may vary in shape as is known in the art. When an array of airfoils is used as illustrated in FIG. 1, a vane 46 may be provided on one or more than one of the airfoils for orienting the airfoils into the wind. If one vane 46 is used for rotation of a plurality of airfoils, the airfoils are interconnected by a mechanical positioning means which causes the airfoils to rotate simultaneously.

Figure 7:
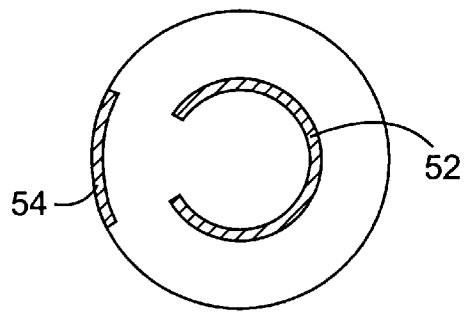
FIG. 7 is a cross sectional view of the airfoil of FIG. 6, taken along line 7—7.

FIGS. 6 and 7 illustrate a further embodiment of an airfoil 50 having a cylindrical member 52 and a leading edge 54. The substantially planar leading edge 54 is formed from a slightly curved plate in the embodiment of FIG. 6 and 7. The curved surface of the substantially planar leading edge 54 reduces the efficiency of the wind collection system due to less change in static pressure caused by the leading edge. However, the embodiment of FIGS. 6 and 7 may provide an increased resistance to mechanical stress through an inherently stronger configuration and longer leading edge life due to slightly lower forces created by the wind on the leading edge 54.

Figure 8:
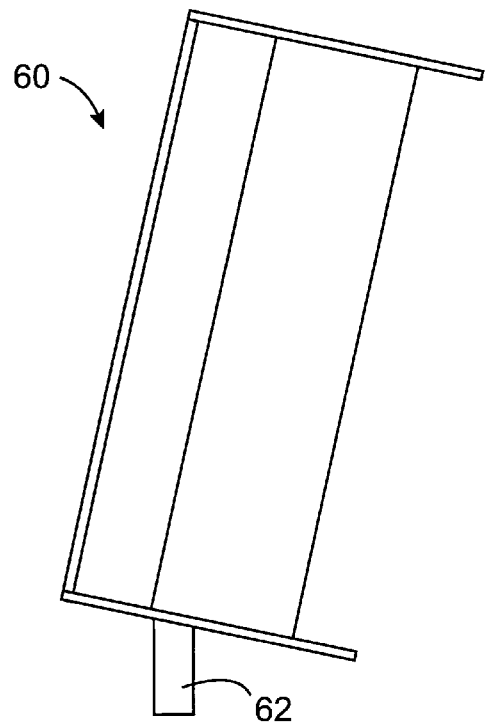
FIG. 8 is a side view of the airfoil of FIG. 2 mounted at an angle.

FIG. 8 illustrates a further alternative embodiment of an airfoil 60 having a construction similar to that of the embodiment of FIGS. 2 and 3 which is mounted at an angle. The mounting of the airfoil 60 on a support 62 such that the airfoil is canted backward out of the wind on the support provides for positioning of the airfoil in the wind stream. Preferably, the airfoil 60 has a vertical axis which is canted from about 1° to about 20° with respect to the vertical axis of the support 62.

The airfoils according to the present invention may be positioned on the corresponding support structures such that the support structure is approximately centered beneath an axis of the cylindrical member. Alternatively, the support structure may be positioned off center towards the leading edge (with the aerodynamic center of pressure aft of the pivot point) to allow the airfoil to be self positioning in the wind. The orientation of the airfoils into the wind may also be accomplished by mechanical means.

Figure 9:
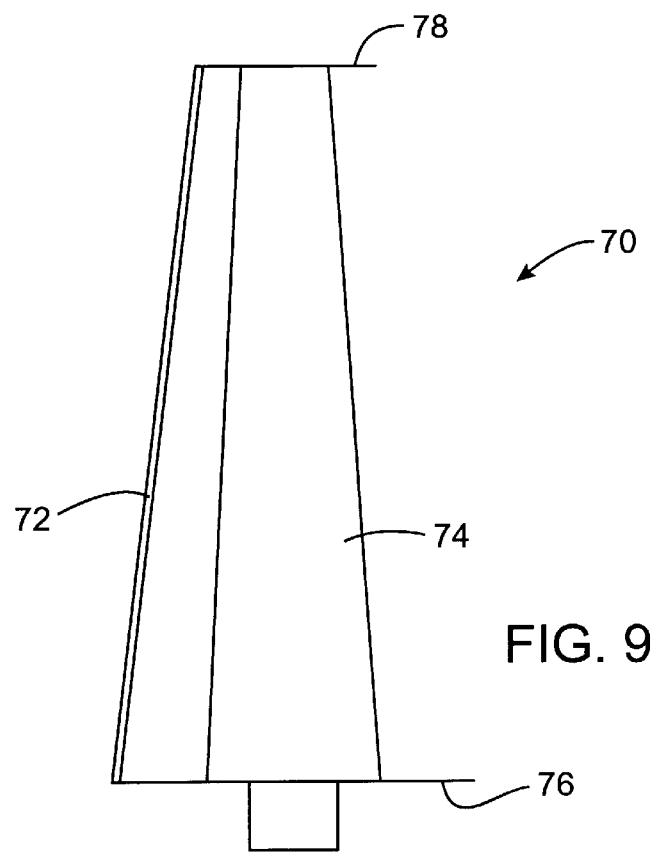
FIG. 9 is a side view of an alternative embodiment of an airfoil having a tapered shape.

FIG. 9 illustrates an alternative embodiment of an airfoil 70 formed from a substantially planar leading edge 72 and a conical member 74. The conical member 74 is circular in cross section and operates in the same manner as the cylindrical member 20 discussed above with respect to the embodiment of FIGS. 2 and 3. The tapered airfoil 70 of FIG. 9 has been found to achieve the same level of draw, or rate of air discharge as provided by a similarly sized airfoil having a cylindrical element. Furthermore, the tapered airfoil 70 achieves the same rate of air discharge with less material, and hence lower cost. Preferably, a cross section through the airfoil 70 has the same preferred dimensions as the embodiment shown in FIG. 3. In addition, a diameter of the conical member 74 at an upper end is preferably about ½ a diameter of the conical member at the base. The airfoil 70 is also preferably provided with a bottom skirt 76 and a top skirt 78 having relative proportions similar to those described above with respect to the embodiment of FIGS. 2 and 3.

Figure 10:
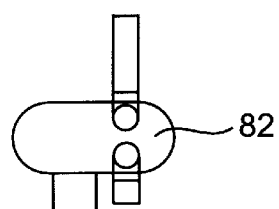
FIG. 10 is a side view of an array of airfoils arranged radially around a hub.
Figure 11:
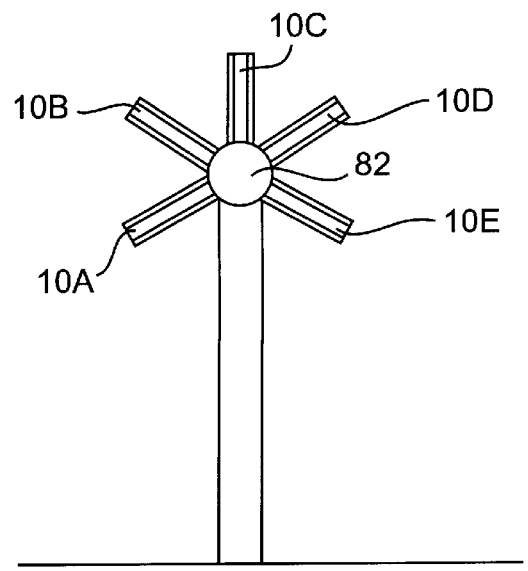
FIG. 11 is a front view of the array of airfoils of FIG. 10.

FIGS. 10 and 11 illustrate a radially arranged array of airfoils 10A–10E which are fixed on a hub 82. The radial arrangement of the airfoils provides an appearance similar to current open air turbine without the external moving parts.

When the airfoils 10 according to the present invention are arranged in an array as illustrated in FIG. 1 or FIG. 10, each airfoil enhances the ambient wind pattern for the adjacent airfoils by forming a series of narrow throats between the airfoils which lead to an increase in the air velocity and a corresponding decrease in static pressure between the airfoils. Thus, the use of the multiple airfoils 10A–10E arranged in an array will magnify the wind collection capabilities of the system. When the airfoils 10A–10E are arranged in a line, the space between adjacent airfoils is about 1 to about 3 times, preferably about 2 times the diameter of the cylindrical member 20 to optimize the efficiency of the system.

The height of the airfoils 10 according to the present invention is preferably about 2 to about 7 times the diameter of the cylindrical member. More preferably, the airfoil has a height of about 3 to about 4 times the diameter of the cylinder member. It has been found that for heights greater than about four times the diameter of the cylindrical member, proportionally less additional energy is produced.

Although the invention has been illustrated with the airfoils positioned vertically, the airfoils may also be positioned horizontally or at any other angle.

As described in U.S. Pat. No. 5,709,419, additional smaller secondary airfoils or concentrator wings may be provided to increase the velocity of the air flow over the airfoils. In addition, the turbines 14 may be provided with filters or screens in the air inlet areas through which air is drawn into the turbine to control the cleanliness of the air drawn though the system.

The improved airfoil configuration according to the present invention provides an improvement in efficiency of more than 2 times over the prior art wind collection system. In addition, the new system is stronger due to the use of the circular cross-section member and is simpler and more economical to construct.

While the invention has been described in detail with reference to the preferred embodiments thereof, it will be apparent to one skilled in the art that various changes and modifications can be made and equivalents employed, without departing from the present invention.

What is claimed is:

1. A device for collecting energy from wind comprising:
   an airfoil formed from a tubular member with a circular cross-section, the tubular member having an elongated opening extending parallel to a longitudinal axis of the tubular member, and a substantially planar leading edge spaced from and positioned in front of the opening, the leading edge having a width which is equal to or less than a diameter of the tubular member;
   an air passageway extending through at least one slot between the tubular member and the leading edge, through the opening, and through an interior of the tubular member to an air duct which allows air to be delivered from a turbine system to the airfoil; and
   a support structure for rotatably supporting the airfoil, the support structure orienting the airfoil so that the planar leading edge is facing into the wind.

2. The device of claim 1, wherein the opening has a width of about 30° to about 80° out of a 360° circumference of the tubular member.

3. The device of claim 2, wherein the leading edge is spaced from the opening by a distance of about 0.1 to about 0.7 times the diameter of the cylindrical member.

4. The device of claim 2, wherein the leading edge width is equal to or greater than the width of the opening.

5. The device of claim 1, further comprising a vane connected to the airfoil for rotating the airfoil on the support structure so that the planar leading edge is facing into the wind.

6. The device of claim 1, wherein the support structure supports the airfoil off center to cause the airfoil to rotate so that the planar leading edge is facing into the wind.

7. The device of claim 1, wherein the airfoil is supported on the support structure with an axis of the airfoil substantially vertical.

8. The device of claim 1, wherein the airfoil is supported on the support structure with a longitudinal axis of the airfoil canted slightly to cause the airfoil to rotate so that the planar leading edge is facing into the wind.

9. The device of claim 1, further comprising top and bottom skirts positioned at a top and a bottom of the airfoil and supporting the tubular member and the planar leading edge, wherein the top and bottom skirts prevent air from above and below the airfoil from disrupting airflow past the airfoil.

10. The device of claim 1, further comprising an array of airfoils and a turbine system wherein the airfoils are arranged with their air passageways connected to the turbine system.

11. The device of claim 10, wherein the airfoils are arranged in a line and a space between adjacent airfoils is about 1 to about 3 times the diameter of the cylindrical member.

12. The device of claim 10, further comprising means for sensing a wind direction and a mechanical means for rotating each of the airfoils in the array of airfoils so that the planar leading edge of each of the airfoils is facing into the wind.

13. The device of claim 1, wherein the airfoil has a height of about 2 to about 7 times a base diameter of the tubular member.

14. The device of claim 1, wherein the tubular member is cylindrical.

15. The device of claim 1, wherein the tubular member is conical.

16. A method for collecting energy from wind comprising:
   providing an airfoil comprising a tubular member having an opening extending parallel to a longitudinal axis of the tubular member and a substantially planar leading edge spaced from and positioned in front of the opening;
   positioning the airfoil in the wind with the leading edge facing into the wind;

passing wind around the airfoil, the wind creating eddies in and around slots between the tubular member and the leading edge and creating a low pressure region in and around the slots;

providing an airflow-driven turbine capable of converting an airflow into mechanical energy;

providing an air passageway from an interior of the tubular member to the turbine; and permitting air to be drawn through the turbine and out of the slots between the tubular member and the leading edge.

17. A device for collecting energy from wind comprising:

an airfoil having a leading edge, the air foil defining an elongated opening extending parallel to the leading edge, the elongated opening being spaced from the leading edge;

the leading edge being canted with respect to the wind, the air foil defines an air passageway and an air duct in communication with the elongated opening to deliver air between the airfoil and a turbine system; and a support structure for rotatably supporting the airfoil, the support structure orienting the airfoil so that the leading edge faces into the wind.

18. The device of claim 17, wherein the airfoil includes a cylindrical member, the cylindrical member defines the elongated opening.

19. The device of claim 18, wherein the cylindrical member is canted at least 1 degree with respect to the vertical.

20. The device of claim 19, wherein the leading edge and the cylindrical member are canted in parallel with each other.

21. The device of claim 20, wherein the leading edge is substantially planar.

\* \* \* \* \*